No. 818,161. PATENTED APR. 17, 1906.
D. S. GRANT.
NON-GRINDING POWER TRANSMISSION DEVICE.
APPLICATION FILED JUNE 12, 1905.

WITNESSES
A. T. Palmer
W. J. Barry

INVENTOR
DAVID S. GRANT
BY
ATT'Y

UNITED STATES PATENT OFFICE.

DAVID S. GRANT, OF STONEHAM, MASSACHUSETTS.

NON-GRINDING POWER-TRANSMISSION DEVICE.

No. 818,161. Specification of Letters Patent. Patented April 17, 1906.

Application filed June 12, 1905. Serial No. 264,781.

*To all whom it may concern:*

Be it known that I, DAVID S. GRANT, a citizen of the United States, and a resident of Stoneham, in the county of Middlesex and State of Massachusetts, have invented certain new and useful Improvements in Non-Grinding Power-Transmission Devices, of which the following is a specification.

The object of my invention is to provide mechanism for use where two interlocking surfaces are slidably engaged and disengaged while one of said surfaces is in motion such that the shock of sudden contact is lessened, thereby preventing excessive wearing or grinding of said surfaces and prolonging the life of the parts.

My device is applicable in a number of ways—as, for instance, in sliding gears, sliding gear and rack, clutch and brake mechanisms, &c.; but I have here illustrated it as applicable to spur-gears only, as the principle is the same in all cases.

In the drawings which form part of this specification I have illustrated a well-known device for intermittently imparting rotary motion from a constantly-revolving shaft to a stationary one and have amplified the illustration by showing a variable-speed mechanism in which my device is attached to each driving-gear.

Figure 1:
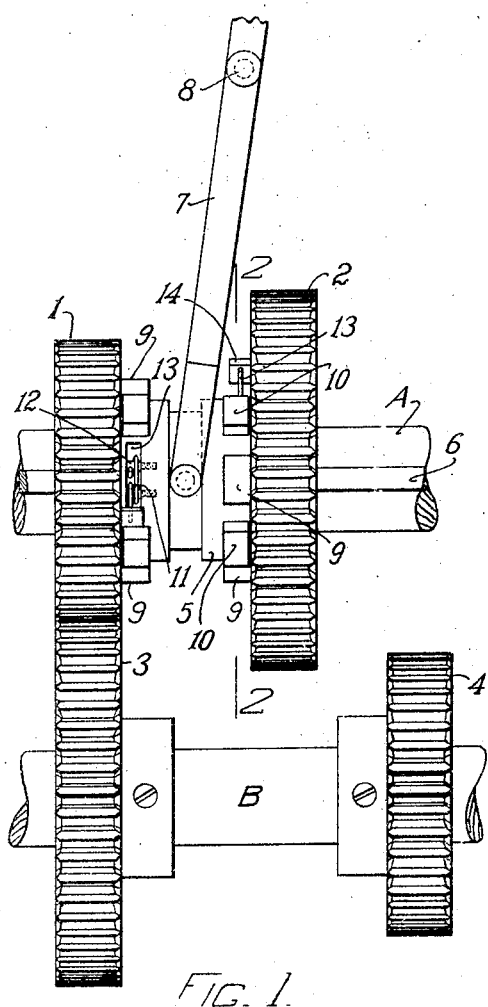
Figure 3:
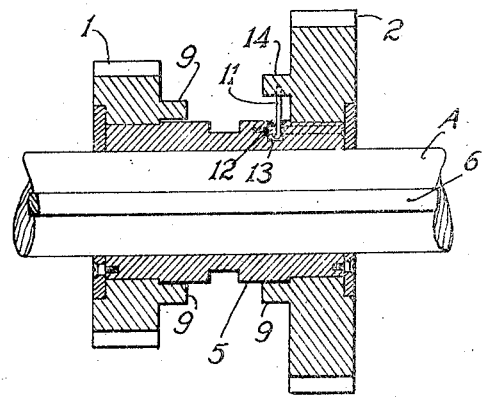
Figure 2:
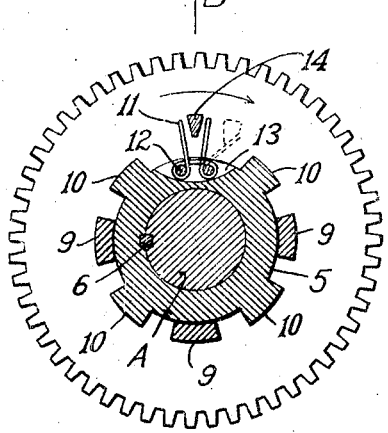

Figure 1 is a side elevation. Fig. 2 is a section on line 2 2 of Fig. 1. Fig. 3 is a section corresponding to line 3 3 of Fig. 2.

A is the driving and B the driven shaft.

1 and 2 are the driving-gears, and 3 4 the driven gears. 1 2 are slidably mounted upon shaft A by means of sleeve 5 and spline 6 and are rotatably mounted upon sleeve 5. Gears 3 4 are rigidly mounted upon shaft B.

7 is the shift-lever pivoted at 8 and operated in the usual manner to cause enmeshing of gears 1 and 3 or gears 2 and 4 and has a neutral position when shaft B is desired to be at rest.

On sleeve 5 is mounted adjacent to each driving-gear one of my spring-clutch devices for breaking the force or shock of the blow caused by the sudden engagement of the gears, as before stated.

As above mentioned, gears 1 and 2 are rotatably mounted upon sleeve 5; but the rotation of said gears with relation to said sleeve is limited by the projecting lugs 9 9, which engage ears 10 10 on sleeve 5. The springs 11 11, mounted on pins 12 12 in a groove 13 in sleeve 5, impinge against a stud 14 in each gear 1 and 2 and lessen the shock of engagement between lugs 9 and ears 10 and also serve to keep the gears 1 2 in central position when out of contact with gears 3 4. These springs may be arranged in various ways or may be replaced by rubber cushions or air-chambers without departing from the spirit of my invention.

Shafts A and B may alternate as driving and driven shafts, or a reverse motion may be obtained without any changes in the mechanism.

From the foregoing description it will be seen that as gears 1 2 enter into engagement with their respective gears 3 4 they are held back from rotation until ears 10 catch up with lugs 9, thus giving time for complete engagement before any positive strain comes upon the teeth. It is well known to those skilled in the art that without my device there is a tendency to wear or grind the entering surfaces of the teeth, and thus in time reduce their effectiveness.

Having thus described my invention, what I claim is—

1. In a non-grinding power-transmission device, a pair of interlocking members capable of being engaged and disengaged with each other, one of said members being loose on its mounting; and means for causing such engagement and disengagement; in combination with means for limiting the change of position of said loose member relative to its mounting; and elastic means for automatically maintaining said member about midway between the limits of said change when said members are disengaged, substantially as set forth.

2. In a non-grinding power-transmission device, a pair of interlocking members capable of being engaged and disengaged with each other, one of said members being rotatably mounted upon its bearing and being provided with a clutching device; a sleeve rigidly mounted upon its bearing and adapted to engage the clutching device in such a manner as to permit a limited motion of said member relative to said sleeve; elastic means for automatically maintaining said member about midway between the limits of said motion when said members are disengaged; and means for causing said engagement and disengagement, substantially as set forth.

3. In a non-grinding power-transmission device, a shaft; a shifting device slidably mounted on said shaft, an interlocking member rotatably mounted on said shifting device and provided with a clutching arrangement; clutch means affixed to said shifting device and adapted to engage with the clutching arrangement on said member so as to limit the amount of rotation of said member relative to said shifting device; a second interlocking member positioned so as to be readily engaged and disengaged by aforesaid interlocking member, through the agency of said shifting device; elastic means for automatically maintaining the first-mentioned interlocking member about midway between the limits of said rotation when disengaged; and means for causing said engagement and disengagement, substantially as set forth.

4. In a non-grinding power-transmission device, a pair of interlocking members, one of said members movable a limited distance on its mounting, a yieldable device coöperative with said latter member to regulate the motion thereof, and means for engaging and disengaging the members.

5. In a device of the class described, a plurality of interlocking members, each having a mounting, at least one of the members having a limited movement on its mounting, a tension device therefor, and means for engaging and disengaging the members.

6. In a device of the class described, coöperative driving members, a shiftable mounting for one of the said members, the latter having a limited movement on its mounting, and a buffer device coöperative with said member when being moved.

7. A yieldingly-mounted power-transmission element, a shiftable mounting therefor, a buffer device operating on said element, and means for shifting the mounting.

In testimony whereof I have affixed my signature in presence of two witnesses.

DAVID S. GRANT.

Witnesses:
ALBAN ANDRÉN,
A. T. PALMER.